(12) United States Patent
Vaughan et al.

(10) Patent No.: US 6,460,955 B1
(45) Date of Patent: Oct. 8, 2002

(54) CABINET, PARTS THEREOF AND ASSOCIATED METHODS

(75) Inventors: Stewart Vaughan; Daniel Witten-Hannah, both of Auckland (NZ)

(73) Assignee: Fisher & Paykel Limited, Auckland (NZ)

( * ) Notice: Subject to any disclaimer, the term of this patent is extended or adjusted under 35 U.S.C. 154(b) by 0 days.

(21) Appl. No.: 09/508,130

(22) PCT Filed: Sep. 9, 1998

(86) PCT No.: PCT/NZ98/00134

§ 371 (c)(1),
(2), (4) Date: May 8, 2000

(87) PCT Pub. No.: WO99/13280

PCT Pub. Date: Mar. 18, 1999

(30) Foreign Application Priority Data

Sep. 9, 1998 (NZ) ................................................ 328703

(51) Int. Cl.[7] .............................................. A47B 43/00
(52) U.S. Cl. ........................ 312/401; 312/236; 312/258
(58) Field of Search ................................. 312/258, 330, 312/406, 406.2, 407, 400, 401, 236

(56) References Cited

U.S. PATENT DOCUMENTS

| | | | | |
|---|---|---|---|---|
| 3,933,398 A | * | 1/1976 | Haag | 312/406 X |
| 4,006,947 A | * | 2/1977 | Haag et al. | 312/406 X |
| 4,043,624 A | * | 8/1977 | Lindenschmidt | 312/406 X |
| 4,580,852 A | | 4/1986 | Smitte et al. | |
| 5,221,136 A | * | 6/1993 | Hauck et al. | 312/406 |
| 5,222,792 A | * | 6/1993 | Kai et al. | 312/406 |
| 5,374,118 A | | 12/1994 | Kruck et al. | |

\* cited by examiner

*Primary Examiner*—John G. Weiss
*Assistant Examiner*—Michael J. Fisher
(74) *Attorney, Agent, or Firm*—Trexler, Bushnell, Giangiorgi, Blackstone & Marr, Ltd.

(57) ABSTRACT

A cabinet for a refrigerator is formed from a twin sheet thermoformed panel (1) divided into a plurality of wall sections, (8, 9, 10) by seams (6) where the twin sheets (2, 3) contact. The panel is folded to form the rear (10) and two side walls (8, 9) of a refrigerator cabinet, and top end cap and a base plinth are fitted to retain the walls in position. Refrigeration system components are carried on the base plinth. The walls (8, 9) and back (10) are secured by having their upper and lower edges (25, 30) fitted within peripheral channels (28, 29) on the top end cap (20) and the base plinth (21). Additionally they may be further secured by fusing contacting portions (65, 76) of the inner sheet of the panel in the region adjacent folded seams (6).

The panel is preferably filled with rigid insulating foam while still supported on the thermoforming mold. The seams (6) are preferably provided on the back face (61) of the cabinet, spaced from the corners between side and rear faces, providing improved aesthetics with the fold lines hidden. An improved heater for softening seams between wall sections is disclosed.

37 Claims, 5 Drawing Sheets

CABINET, PARTS THEREOF AND ASSOCIATED METHODS

TECHNICAL FIELD

This invention relates to cabinets, parts of cabinets prior to final assembly and to methods of forming cabinets and, in particular, to insulated refrigerator cabinets and methods of forming same.

BACKGROUND ART

At present the construction of domestic refrigerators, particularly the cabinets, are commonly made from a formed steel exterior, which is either pre-painted or post-painted, into which a thermoformed plastic interior is placed locating in a roll formed edge. A steel or plastic base is attached to the bottom and top of this assembly along with a back panel of similar materials to create a closed cavity between the exterior and interior. This assembly is placed into a jig that supports the walls of the cabinet whilst insulation is injected and expanded into the cavity. Associated with this type of construction are additional processes that seal the joints between the individual parts in order to prevent the expanded foam from leaking.

U.S. Pat. No. 4,580,852 shows a refrigerator incorporating a cabinet of this type. The major drawbacks with this type of construction and manufacturing process are the number of individual parts, processes, and their associated costs. In addition to this the processes are time consuming and labour intensive.

U.S. Pat. No. 5,374,118 assigned to Whirlpool Corporation shows a refrigerator cabinet wherein the side walls and top are formed by twin-wall thermoforming as a single part. They are folded and a back is fitted to the cabinet to support them in position. The back of the cabinet incorporates the refrigeration system. While this system offers a significant improvement over the prior art, difficulties are perceived with the overall cabinet space occupied by the refrigeration system carrying back unit and with difficulties of connecting and sealing the back unit to the remainder of the refrigerator cabinet.

DISCLOSURE OF THE INVENTION

It is therefore an object of the present invention to provide a cabinet and or parts thereof and or a method of forming same which will go some way towards overcoming the above disadvantages or will at least provide the public with a useful choice.

In one aspect the invention consists in a refrigerator cabinet comprising:
  a twin walled insulated plastic member divided, by a plurality of elongate seams at which said twin walls contact, into three or more wall sections disposed sequentially in a side by side relation, said member folded at said seams such that said sequence of wall sections form three or more sides of a cabinet connected at said elongate seams, said sides defining a refrigeration space there between,
  a top end cap connected to the top edge of said wall member retaining said wall member in said folded configuration, said top end cap enclosing the top end of said refrigeration space,
  a base plinth connected to the bottom edge of said wall member retaining said wall member in said folded configuration, said base plinth supporting, directly or indirectly, mechanical components of said refrigeration system, and
  floor means, integral with or separated from said base plinth, to enclose the bottom end of said refrigeration compartment.

In a still further aspect the invention consists in a refrigerator including a refrigerator cabinet as described above, a door mounted on said refrigeration cabinet to enclose the front side of said refrigeration space and thereby fully enclose said refrigeration space, and a refrigeration system to refrigerate said refrigeration space, at least a part of said refrigeration system being mounted on said base plinth.

In a still further aspect the invention consists in a method of forming a refrigerator cabinet comprising the steps of
  (a) thermoforming a twin walled insulated plastic member divided, by a plurality of elongate seams at which said twin walls contact, into three or more wall sections disposed sequentially in a side by side relation.
  (b) folding said plastic wall member along each said seam to form three or more sides of a cabinet connected at said elongate seams, said sides defining a refrigeration space therebetween, and
  (c) fitting a top end cap to said cabinet to retain said wall member in said folded configuration and enclose the top end of said refrigeration space, and
  (d) fitting a base plinth to the bottom edge of said wall member to retain the bottom edge of said wall member in said folded configuration.

In a still further aspect the invention consists in a refrigeration cabinet formed by a method in accordance with one or more of the above paragraphs.

In a still further aspect the invention consists in a cabinet including:
  a twin walled plastic member divided, by a plurality of elongate seams at which said twin walls contact, into three or more wall sections disposed sequentially in a side by side relation, said member folded at said seams such that said sequence of wall sections form three or more sides of a cabinet connected at said elongate seams, and
  a top and or a bottom end cap, having generally an interior and an exterior face and having on the inner face along at least two sides thereof at or adjacent the periphery thereof a recessed channel, the top and/or bottom edge respectively of said folded plastic wall member fitted into said channel or channels, said channel or channels retaining said wall member in said folded configuration.

In a still further aspect the invention consists in a cabinet for an appliance including a wall member formed by twin sheet thermoforming, said wall member incorporating a plurality of panels, said panels connected to one another by one or more joined edges where said twin sheets contact to form a seam, and in said appliance said wall member being in a folded condition along one or more of said seams such that said plurality of panels form a plurality of walls of said appliance, being, as a group, differently configured to when said wall member was initially thermoformed, wherein one or more of said folded seams do not coincide with the corner between walls of said appliance that correspond to the panels joined by the respective folded seam.

In a still further aspect the invention consists in a cabinet for an appliance including a wall member formed by twin sheet thermoforming, said wall member incorporating a plurality of panels, said panels connected to one another by one or more joined edges where said twin sheets contact to form a seam, and in said appliance said wall member being in a folded condition along one or more of said seams such that said plurality of panels form a plurality of walls of said appliance, being, as a group, differently configured to when said wall member was initially thermoformed, at at least one said seam said twin walled plastic member having essentially an inner facing sheet and an outer facing sheet, and said member is formed adjacent at said seam such that in said folded condition said inner facing sheet contacts itself, said contact being between portions thereof on opposite sides of said seam and spaced from said seam, said contacting portions being fused to one another.

In a still further aspect the invention consists in a wall member formed by twin sheet thermoforming including one or more seams where said twin sheets contact, said wall member adapted to be folded at one or more of said seams to form a plurality of walls, characterised in that at least one said seam is intended to be folded through a set angle, and that at least one said sheet of said twin sheets includes, at or substantially at said seam, a transition between surfaces thereof which is the complement of the said set angle, such that if said seam is folded through said set angle, said surfaces will be substantially continuous across said seam.

In a still further aspect the invention consists in apparatus for preparing a twin sheet thermoformed wall member, including one or more seams at which said wall member is to be folded bringing included faces of said wall member at said seam together, for folding comprising a heat conductive head having a heating face configured to contact along said seams to be folded at, means to heat said heat conductive head, said head supported on a support means, which, together with a support means associated with said wall member is adapted to bring said head heating face into contact with said seam and by that contact allow the transfer of heat from said head to said seam and thereby soften said seam for folding.

In a still further aspect the invention consists in a cabinet for a refrigerator substantially as herein described with reference to and as illustrated by FIGS. 1 to 5 of the accompanying drawings.

In a still further aspect the invention consists in a cabinet for a refrigerator substantially as herein described with reference to and as illustrated by FIGS. 6 and 7 of the accompanying drawings.

In a still further aspect the invention consists in a method of forming a refrigerator cabinet substantially as herein described with reference to and as illustrated by the accompanying drawings.

In a still further aspect the invention consists in a cabinet for an appliance including a corner arrangement substantially as herein described with reference to and as illustrated by FIG. 9 of the accompanying drawings.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Embodiments of the present invention will now be described in detail with reference to the accompanying drawings in which.

BEST MODES FOR CARRYING OUT THE INVENTION

Figure 5:
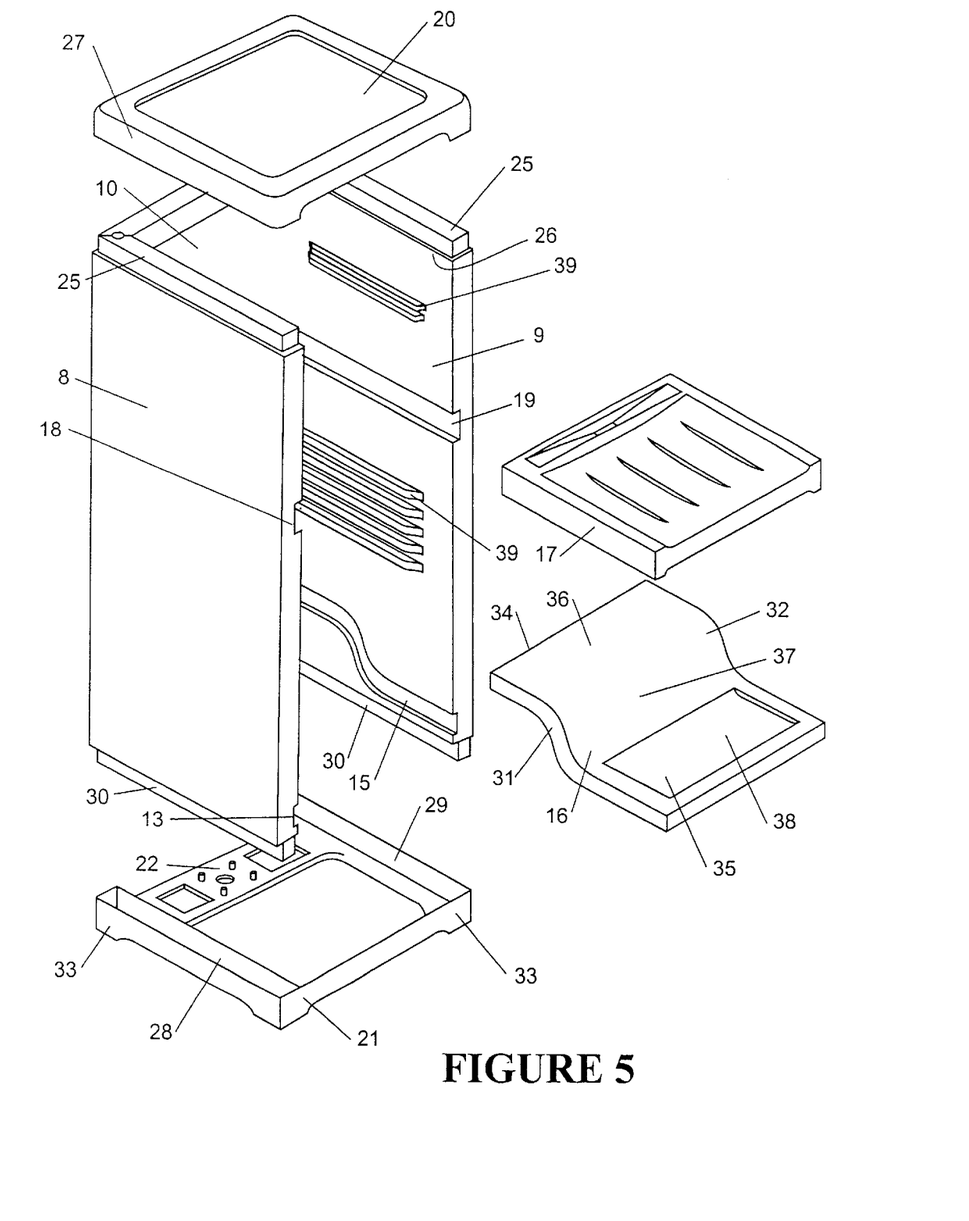
FIG. 5 is an exploded perspective view of a refrigerator cabinet assembly according to the present invention.

With reference to FIG. 5, a cabinet is shown for a refrigerator which has side walls 8,9 and a rear wall 10 which are integrally connected at hinged regions 6. The side walls 8,9 and rear wall 10 are folded at the hinged regions to form the sides 8,9 and rear wall 10 as shown. The walls 8,9,10 are retained in the folded condition by a top cap 20 and by a base plinth 21. The top cap also serves to enclose the top end of the refrigeration chamber defined by the side walls 8,9 and back wall 10. A floor partition 16 is disposed within the chamber to enclose the bottom side of the refrigeration chamber. The base plinth 21 is disposed with connections 22 for mounting elements of the refrigeration system, notably the compressor, control system and expansion valve. The base plinth 21 may otherwise remain substantially open. For refrigerator configurations incorporating a fresh food refrigeration compartment and a freezer compartment, a compartment divider 17 is provided.

Figure 7:
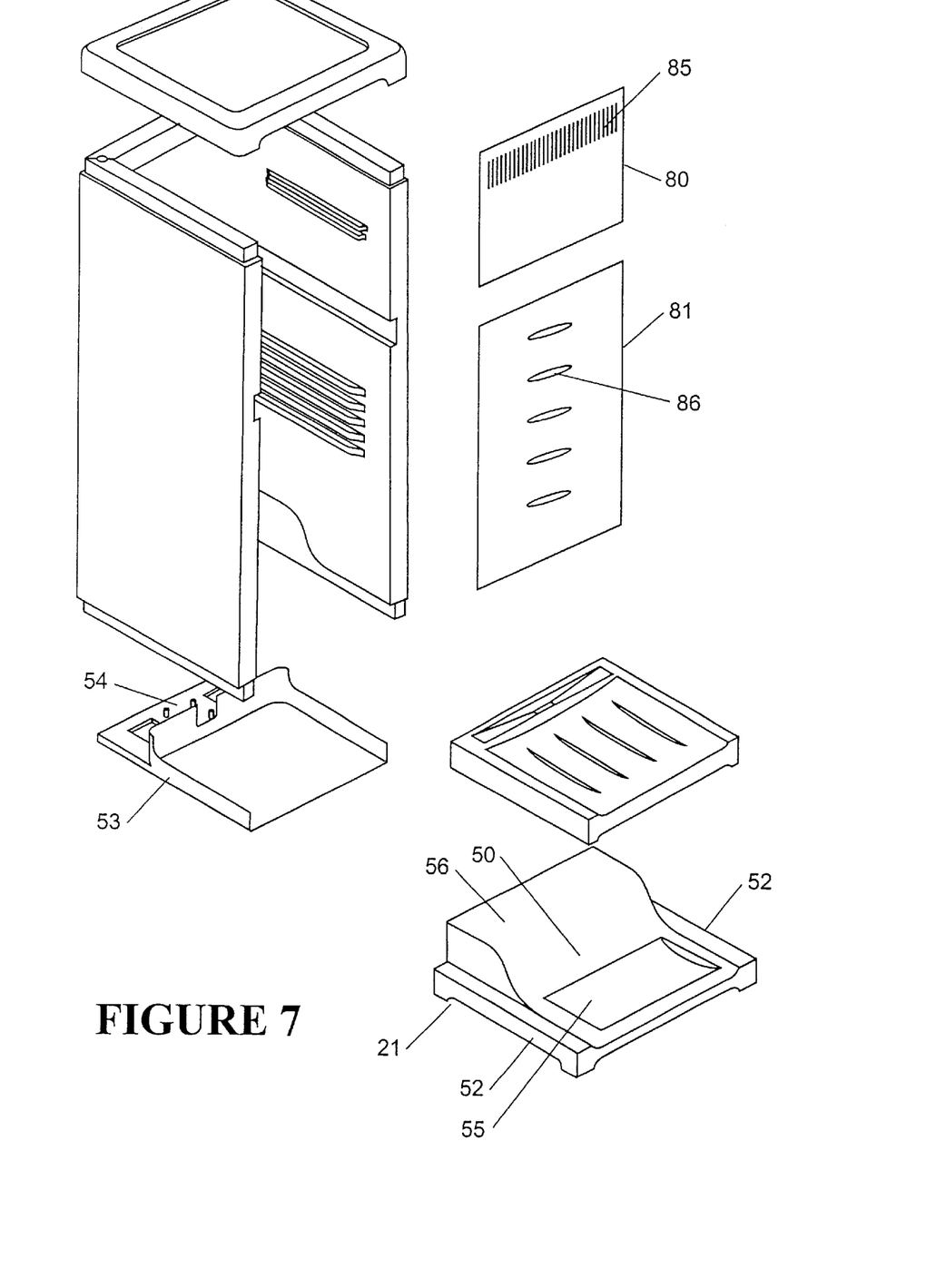
FIG. 7 is an exploded perspective view of a refrigerator cabinet assembly according to said alternative embodiment.

With reference to FIG. 7 an alternative embodiment is shown wherein the bottom partition is incorporated in the base plinth in an integrated manner as a floor member 50. The floor member 50 defines a space there below bordered by side footings 52. Refrigeration system mechanical components are located on connections 54 of a carrying tray 53 which is slidably fitted within the space below the floor member 50 and supported by the side footings 52.

The method of forming the side and back walls 8,9,10 will be described later with reference to FIGS. 1–4, as will the overall assembly of the refrigerator.

With reference to FIGS. 5 and 7 the top cap 20 of the refrigerator both encloses the top end of the refrigeration space and also retains the top edge 25 of the walls 8–10 within a channel formed on the lower face thereof. The top edge 25 of the walls 8–10 is preferably formed with a rebate 26, thereby forming a tongue-like projection, so that when fitted, the outer side faces and end face 27 of the top cap 20 sit flush with the external surfaces of the side and rear walls 8–10.

Similarly the base plinth 21 is provided with channels 28 and 29 adjacent the side extremities thereof. The channels 28, 29 accommodate tongue portions 30 of the lower edge of the side walls 8 and 10. Once more the tongued or rebated configuration allows the side faces of the base plinth to sit flush with the side surfaces of the refrigerator cabinet. As can be seen from FIG. 5 in conjunction with FIG. 3, the rear wall 10 of the cabinet preferably finishes at a point above the lower edge of the side walls 8 and 9. This leaves an opening at the rear of the refrigerator for access to the refrigeration system components (mounted on the base plinth connections 22 in FIG. 5 and on support tray 51 in FIG. 7), and allows air flow therearound as necessary. The base plinth 21 also preferably includes foot portions 33 extending slightly downwardly therefrom to support the refrigerator cabinet on a supporting surface. Adjustable feet as are known in the prior art may be fitted as required.

With reference to FIG. 5 floor partition 16 is preferably disposed with the side edges 31, 32 thereof disposed within channels 13, 15 formed in the interior side walls of the refrigerator cabinet and the rear edge 34 thereof disposed in recessed channel 14 along the lower edge of the rear wall. The floor preferably includes a transition from a substantially horizontal forward portion 35 to a substantially horizontal rearward portion 36 via a sloped and curved transition region 37. The floor partition may also include interior detailing such as drip tray 38.

Figure 6:
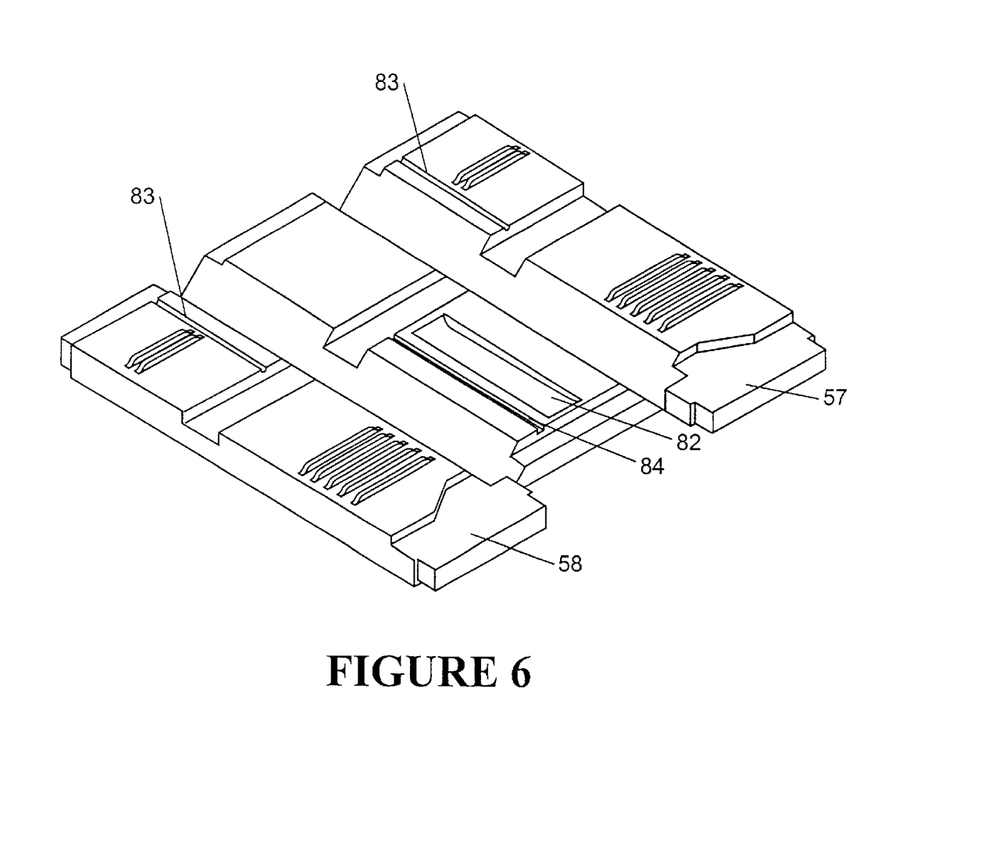
FIG. 6 is a perspective view in cross section of a twin sheet panel according to an alternative embodiment of the present invention.

With reference to FIGS. 6 and 7, in the alternative embodiment the floor preferably includes a similar transition between a front plateau 55 and a rear plateau 56. The interior faces of the side walls of the refrigerator cabinet are formed with a shaped rebate 57,58 therein, the upper edge of which generally follows the contour of the upper lateral edges of said floor member, with the raised part of said base plinth being located within the rebate 57,58.

With reference to FIGS. 5 and 7 the walls 8, 9 and rear wall 10 of the cabinet may have their internal faces thereof formed with detailing such as tray supporting rails 39 formed integrally therein. Other manners of applying such details to these walls may also be apparent to persons skilled in the art, for example, by plastic welding facia panels to flat surfaces, however this seen as a rather inefficient manner of forming such detailing.

Similarly the divider 17 may contain additional details for door hinging, air ducting and interior styling.

Figure 1:
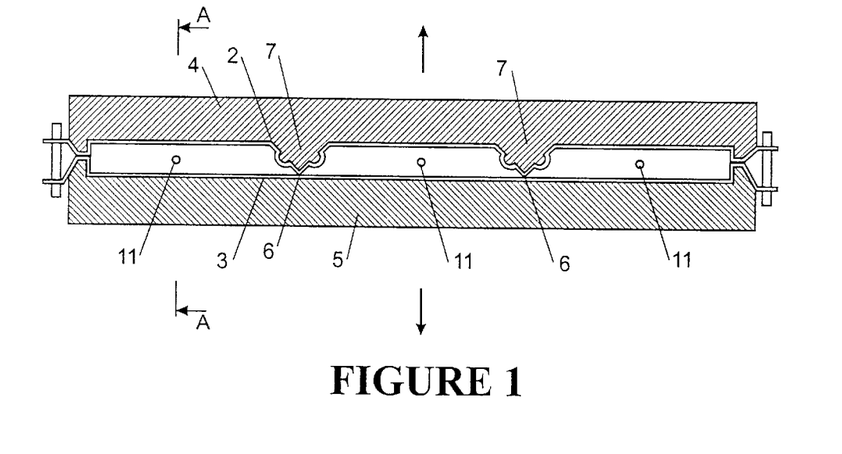
FIG. 1 is a cross-sectional end elevation through a thermoforming mould for forming the twin sheet wall forming panel of the present invention, in a closed configuration.
Figure 2:
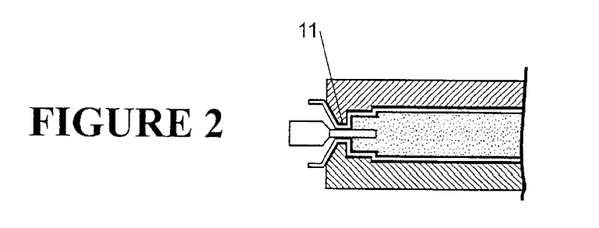
FIG. 2 is a cross-sectional side elevation on A—A of the mould of FIG. 1 during a foaming operation.
Figure 3:
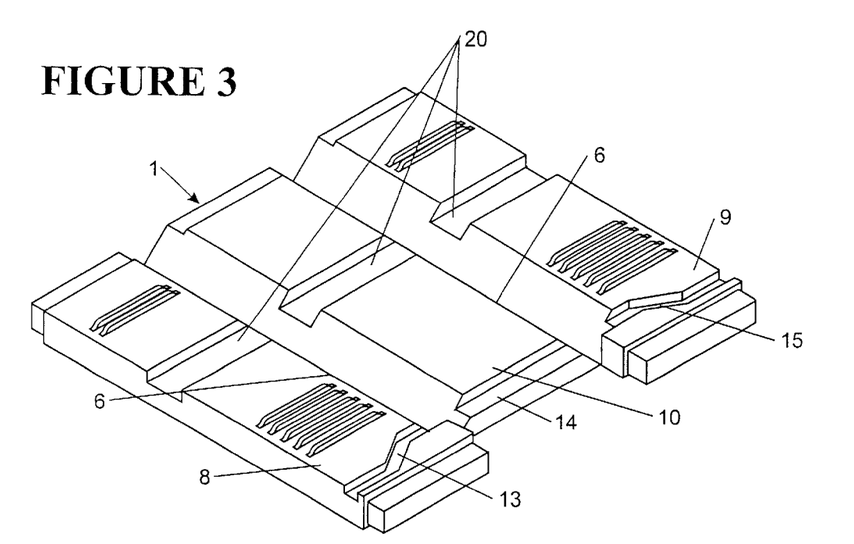
FIG. 3 is a perspective view of the twin sheet panel of a first embodiment of the present invention subsequent to removal from the mould.

With reference to FIGS. 1 and 3 the side walls 8,9 and rear wall 10 of the cabinet are formed by simultaneously thermoforming the exterior and interior of the cabinet as a single flat panel 1 from two plastic sheets 2,3 that can be of differing thicknesses, colours or material composition. The sheets 2, 3 are heated and are initially held at their periphery by supporting flanges 12. Air is injected between the sheets 2,3 as the moulds, interior 4 and exterior 5, are closed over the sheets 2,3 assisting in the thermoforming process. The above aspects of the twin-sheet thermoforming process itself is known in the art and will not be described in detail herein.

The correspondingly formed panel 1 has two folding/hinging regions 6 placed into it by ridges 7 in the profile of the interior mould 4. The hinging regions 6 divide the panel into three cavities, two side walls 8,9 and a rear wall 10. In the hinging region the interior sheet 4 is attached to the exterior sheet 5 to form the folding line.

Figure 4:
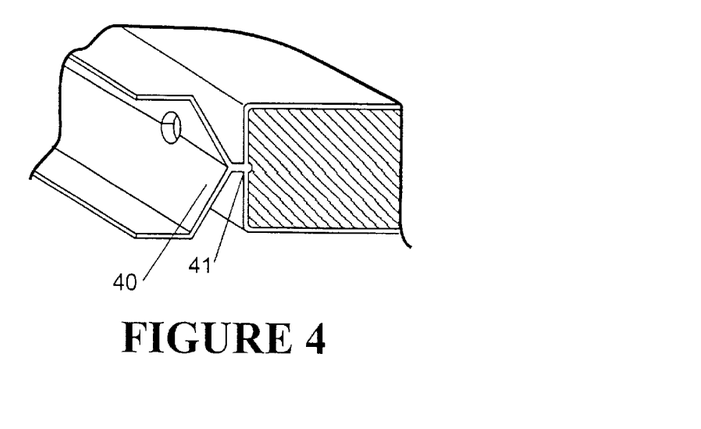
FIG. 4 is a partial perspective view in cross-section of an end edge of the panel immediately after removal from the mould.

With reference to FIG. 4, after thermoforming the panel remains in the mould and insulating foam 40 is injected into the three cavities through are injection holes 11 from the thermoforming process. The thermoforming mould 4,5 then acts at a foaming jig, supporting the walls whilst the foam expands and sets.

After sufficient time for the foam to cure, the foamed panel is then removed from the mould 4,5 and the supporting flanges 12. With reference to FIG. 4, during removal from the mould or some time thereafter and before assembly, excess material 40 is trimmed from the moulded member 1. The material is preferably trimmed flush with the join 41 between internal and external sheets, to leave a clean exterior finish. Exposed joins may be finely polished to provide an aesthetic finish.

Figure 8:
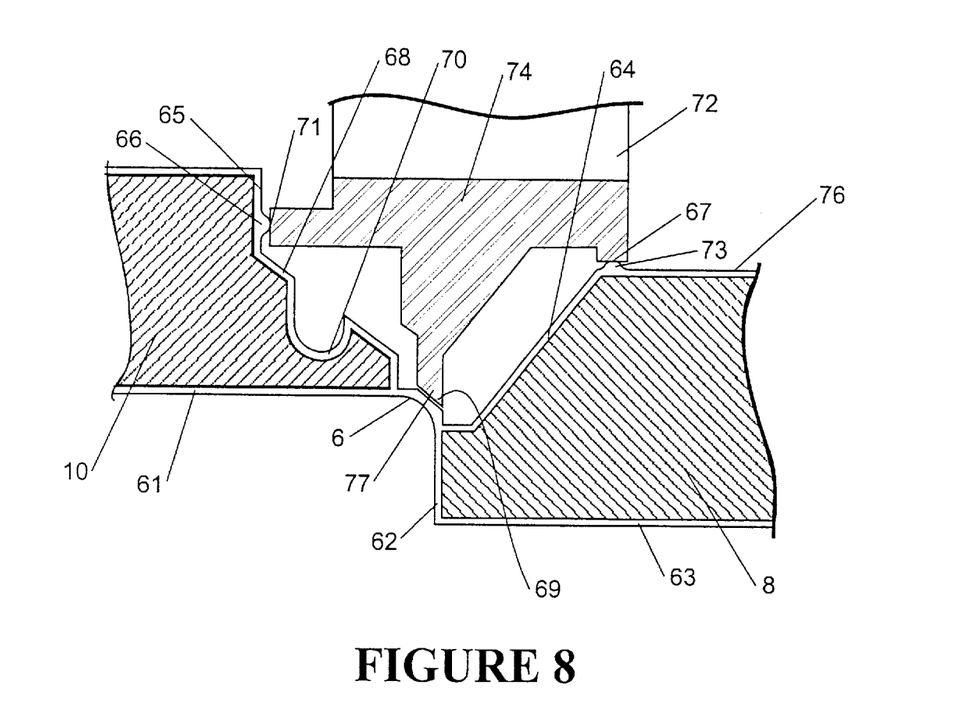
FIG. 8 is a cross sectional plan elevation through the portion of a twin sheet panel according to the preferred embodiment of the present invention that, when folded up to form a refrigerator cabinet assembly, will form a corner between the back and a side thereof, and additionally showing a tool for heating and softening parts of one or both of the twin sheets.

Referring to FIG. 8 an advantageous configuration of the corner area of a the thermoformed panel is shown. The corner area is between a side wall 8 and the rear wall 10 of the refrigerator, with the twin sheets essentially being assigned as either an inner sheet or an outer sheet, depending on whether they form the inner faces of the corner or the outer faces. The corner is intended to be formed by folding the panel through a set angle at the seam 6 where the inner and outer sheets contact, the angle corresponding to the intended angle between the walls when assembled. To this end the regions 64, 68 of the inner sheet approaching the seam include an angle substantially the same as the set angle, so that when the panel is folded at the seam these regions will be substantially adjacent and there will not be a significant opening or crevice there between. Configurations are of course possible where this included angle is biassed toward one sheet or another, with a seam with width approximately the same as the thickness of the panel being one extreme possibility. However in the preferred embodiment, for better overall strength and ease of forming, the included angle is embodied as a pair of faces 64, 68 which are at a general angle of 45 degrees to the general plane of the sheet, to thereby mutually include an angle of approximately 90 degrees.

Figure 9:
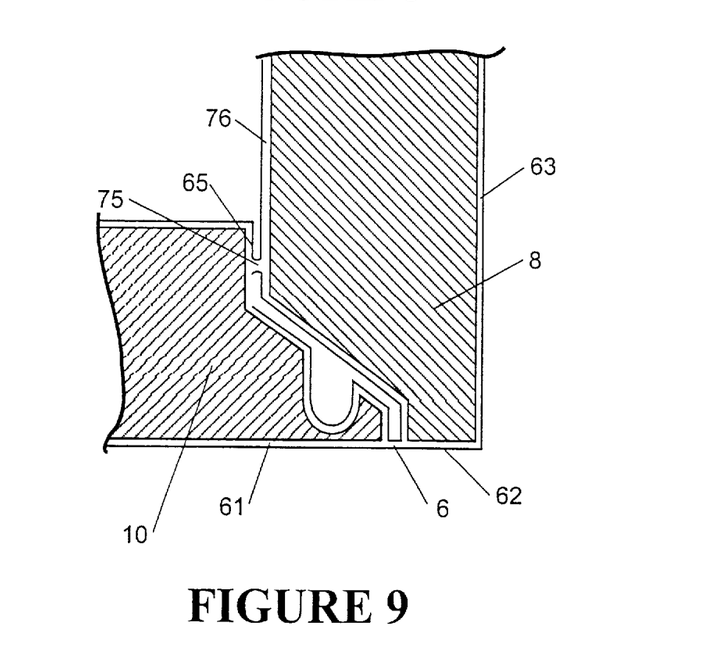
FIG. 9 is a cross sectional plan elevation through the refrigerator cabinet corner formed from that panel portion of FIG. 8.

The outer sheet is configured to with a transition at the seam of the thermoformed panel, between the outer face 61 of the panel section 8 that will broadly form the back wall, and the minor outer face 62 of the panel section 10 that will broadly form the side wall, which is basically the complement of the set angle through which the panel is to be folded at the seam 6. With the outer sheet thus configured, when the sheet is folded through the set angle the face 61 and the face 62 will become aligned across the seam to form a substantially continuous plane, the back wall surface. There is of course a further transition in the outer sheet, falling in that pat of the panel that will form the side wall, and the transition being between the minor face 62 and the major face 63 of that panel section, with that transition, when folded, forming the corner of the cabinet. In this way the seam between the side and rear panels of the cabinet is provided along a line that is parallel with and near the corner, but is not at the corner, and so can be hidden on the back face of the refrigerator, which in nearly all installations will be fairly well hidden from view. This is depicted in FIG. 9 which shows the panel in its folded configuration, the seam 6 being clearly disposed on the back face of the refrigerator cabinet. Other configurations of these transitions are of course possible depending on the angles through which the panel is to be folded, possible overall curvatures of the panel sections and possible curvature of the corner itself, without departing from the general intention of this aspect of the invention.

With continued reference to FIGS. 8 and 9 aspects of the preferred folding process are depicted. In the prior art systems that have suggested folding twin sheet panels at a seam, the seam has been heated by disposing a radiant heater, such as a wire of high electrical resistance, in close proximity to the seam immediately prior to folding, to soften the seam. However with a panel of the size necessary to form the walls of a refrigerator cabinet it has been found that such techniques are inappropriate, for example due to wire sag, and the ability to hold the heater sufficiently close to heat the seam without also heating and thereby facilitating deformation of the surrounding sheet. Therefor in the preferred assembly method a heater is provided in which a highly conductive heater head 74 is supported on a heater support member 72, which is moveable relative to the panel to bring a heating face 77 thereof into contact with the seam 6 of the panel. The heater head and heating face are preferably substantially coextensive with the seam 6. To facilitate this contact the seam region may be formed having a significant width, and may include a greater heat receiving surface, such as by the inclusion of chamfer 69 on the inner side thereof. This heating operation may advantageously be provided while the panel is still supported on its lower mould, however it may equally be carried out with the panel support ed on another supporting surface so long as it is reasonably accurately positioned with respect to the heater head 74 and head support member 72. It should be readily apparent that the use of a conductive heater head allows for a more localised heating, particularly as the conductive head is more readily formed from a solid and rigid material, such as an aluminium block. This lessens the adverse heating that is caused to adjacent areas of the sheet and reduces the heating time. The heat conductive block preferably includes a coating which helps the block release from the heated plastic material without deforming the plastic material. A PTFE coating has been found suitable for this purpose.

As already described the inner sheet of the panel includes an angle between the faces 68 and 64 which are to eventually nearly meet in the assembled construction. This similar angle also exists between at least the regions of faces 65 and 76 which are adjacent the faces 68 and 64, but further from the seam 6. Due to the step that is advantageously incorporated in the outer sheet (for reasons described above), these regions of the faces 65 and 76 will also come into close alignment and proximity. In the preferred embodiment of the invention the close proximity and alignment of the faces, 68 and 64 and/or 65 and 76, is used to provide a further fused joining between the panel sections, spaced away from the seam 6, to thereby permanently lock the panels into their folded configuration. To assist the fusing process nodules 66, 67 of plastic material are raised from the general surrounding surfaces 76, 65. The nodules may comprise localised raised areas, or may comprise ridges being substantially coextensive with the seam 6. The conductive heating head 74 is provided with further heating faces 61 and 73 and the heater support 72 is configured to bring these heating faces into contact with the nodules, 66 and 67 respectively, simultaneously with contacting face 77 against the seam 6. With the panel being subsequently folded while the nodules are substantially molten the nodules contact and fuse together to form a weld 75 between the faces 65 and 76 of the inner sheet of the panel. In use the weld not only provides a significant increase in the stiffness of the cabinet but also serves to seal the crevice between the faces 68, 64 of the inner sheet at a location near the surface of the crevice.

The corner is shown to be between the left side 8 and back 10 walls of the refrigerator cabinet but it is clearly applicable to other seams between sections of a thermoformed panel that are intended to be folded in formation of an article such as a cabinet, particularly where one of the external faces thereof is likely to be substantially hidden from view in general use.

In the embodiment of FIG. 5 floor partition 16 is introduced into the assembly prior to the folding and is locked in place by a recess 13, 14, 15 formed in the side and back walls of the folded panel once the side walls 8, 9 have been fully folded into position. The floor 16 is preferably a foam core sandwich with a plastic outer skin.

With reference to FIGS. 5 and 7 for dual temperature fridges a compartment divider 17 of similar construction to the floor 16 is inserted into channels 18, 19 formed in the side walls, as recess 20 extending across the panel (see FIG. 3) to create the division between the freezer and refrigerator compartments. This divider 17 interlocks the sides 8, 9 of the folded panel 1 and is in turn locked in place by the restrained sides of the folded panel. The divider 17 contains additional details for door hinging, air ducting, and interior styling. The divider may be provided with a dove tail, mortise and tenon, connection to said side walls or may be provided with simple rectangular side edges.

With the divider and/or floor partition in place the top cap 20 is fitted to the top edge 25 of the folded panel. The tongue portion formed by rebate 26 fits within a channel in the underside of the top cap 20, to be retained thereby in the folded configuration.

The folded panel is further fitted with the base plinth 21 at the bottom edge thereof with the lower edge 30 is side walls 8 and 9, having the tongued portion thereof fitting within channels 28, 29 formed on the top face along the sides of the base plinth. The base plinth 21, like the top cap 20 retains the wall forming panel 1 in the folded configuration shown in FIGS. 5 and 7.

With further reference to FIG. 7, some additional detail demonstrating how a refrigeration system may be incorporated in the refrigerator can be seen. In particular the refrigerator includes a baffle panel 80, 81 in each of the freezer and refrigerator compartments respectively, with each baffle panel forming the back wall of its respective compartment. Air recirculation ducts, which may be partially formed (for example the channel 82) in the twin sheet thermoformed panel, are concealed behind the baffles. The baffle for the freezer compartment is configured to be spaced forward of the inner face of the thermoformed panel, with its edges secured in grooves 83 in the side walls of the compartment, to provide a subcompartment therebehind. This subcompartment is utilised for housing the evaporator of the refrigeration system. One or more fans are positioned in the ducts which force the recirculation of air over the outer surface of the evaporator, with the cooled air then being passed into either the freezer or refrigeration compartment as desired, through the apertures 85, 86 in the respective baffle 80, 81. A channel 84 may be provided in the thermoformed panel to facilitate the egress of condensation which may form from time to time on the evaporator and be removed during a defrosting process. The channel 84 leads to a position just above the refrigerator compressor, where the condensation may fall into a tray mounted on the compressor head to thereby absorb heat from the compressor head and be evaporated away. Refrigeration systems of this general configuration form are known in the art, and do not form a significant p art of the present invention.

A refrigeration system as is known in the art, such as a standard vapour compression refrigeration system may be fitted to the cabinet. In such a system the compressor, condenser and any control system may be carried by the base plinth with the evaporator inside the refrigeration space, such as in the manner described above with reference to FIGS. 6 and 7. A door or doors is mounted on the fridge front, supported between hinge parts on the front edges of the top cap and base plinth and on the compartment divider panel. The doors are preferably also formed by twin sheet thermoforming with insulating foam injected into the cavity, as is known in the art.

The above description has been given with reference to refrigerator cabinets. The process is thought to be sufficiently versatile to also be appropriate for other cabinet types, particularly cabinets requiring a twin walled insulated structure. It is also readily apparent that while the above cabinet has been described as a pair of side walls and a rear wall, it would be a simple modification to incorporate any number of walls, with a corresponding change in the included angle between abutting transition faces.

It is readily apparent that the refrigerator cabinet according to the present invention, and as described above, includes significant advantages over the prior art. The refrigerator cabinet is provided with a simple construction having few parts, and which parts fit together in a manner so as to be self interlocking, giving the cabinet strength and rigidity. Cabinet dividers and partitions are engaged within the cabinet in an interlocking manner which provides good seals from both a thermal and moisture perspective, as does the engagement of the top cap with the top edge of the folded wall assembly. The base plinth, provided with the many mechanical elements of the refrigerator system is disposed beneath the bottom partition, easily accessible from the rear of the fridge, and minimising wasted potential refrigeration space within the refrigerator cabinet. It will also be appreciated that smooth curves and exterior lines will be readily possible, moulded into the exterior shape of the top cap, and into the outer sheet of the folded panel.

It will also be readily appreciated that the simplicity of assembly means the refrigerator cabinet of the present invention can be shipped in a knockdown form, with final assembly taking place at a n entirely separate and potentially distant location than component production. This will provide significant benefits in shipping costs, where costs for low density products (such as refrigerators) are usually based on volume rather than weight.

What is claimed is:

1. A refrigerator cabinet comprising:
   a twin walled insulated plastic member divided, by a plurality of elongate seams at which said twin walls contact, into three or more wall sections disposed sequentially in a side by side relation, said member folded at said seams such that said sequence of wall sections form three or more sides of a cabinet connected at said elongate seams, said sides defining a refrigeration space there between,
   a top end cap connected to the top edge of said wall member retaining said wall member in said folded configuration, said top end cap enclosing the top end of said refrigeration space,
   a base plinth connected to the bottom edge of said wall member retaining said wall member in said folded configuration, said base plinth supporting, directly or indirectly, mechanical components of said refrigeration system, and
   a floor enclosing the bottom end of said refrigeration compartment.

2. A refrigerator cabinet as claimed in claim 1 wherein said top end cap has generally an interior and an exterior face and has on the interior face, along at least two sides thereof, at or adjacent the periphery thereof, a recessed channel, the top edge of said folded plastic wall member fitted into said top end cap channel, said top end cap channel retaining the top edge of said wall member in said folded configuration.

3. A refrigerator cabinet as claimed in claim 2 wherein the parts of said top edge of said wall member which fit in said channels of said top end cap, are formed as a tongue, said tongue being of lesser thickness than the general thickness of said wall member, the tongue being fitted in the channel, such that the side and rear facing faces of the top end cap are flush with the cabinet sides formed by the folded plastic wall member.

4. A refrigerator cabinet as claimed in claim 1 wherein said twin walled insulated plastic member is generally configured with an inner facing and an outer facing plastic sheet, said inner facing plastic sheet including interior detailing in the side wall and/or rear wall portions thereof, said inner facing sheet being spaced from said outer facing sheet by an insulation filled gap, but contacting said outer facing sheet at and along said seam, and said inner facing sheet includes along each side of each said seam a transition face extending between said seam and the cabinet interior forming general part of said inner facing sheet, opposed said transition faces abutting with said wall member folded.

5. A refrigerator cabinet as claimed in claim 4 wherein said twin walled insulated plastic member is divided into three wall sections, forming, when folded, the left side, rear, and right side walls sequentially, and said transition faces of said inner facing sheet of said plastic member include an angle of approximately 90°.

6. A refrigerator cabinet as claimed in claim 4 wherein at least one said transition face of said opposed pair of transition faces across each seam includes a channel formed longitudinally therein, such that an enclosed vertical shaft is formed by said abutting transition faces with said wall member folded, said shaft which may enclose refrigeration system components and/or ancillary components and/or including means to lock said abutting transition faces in said abutted condition or being empty.

7. A refrigerator cabinet as claimed in claim 1 wherein said twin walled insulated plastic member is divided into three panels, forming sequentially a left side, back and right side wall of said refrigerator, said back wall panel of said wall member being shorter than said left and right side wall panels of said wall member, said wall member thus having a notch formed in the bottom edge thereof, said notch extending between said elongate seams, said notch allowing an open space at the back of said refrigerator adjacent said base plinth, said base plinth including wall retaining channels along two opposed sides thereof, said channels retaining the bottom edge of each of said left and right side walls, to thereby connect to and retain said plastic wall member in said folded configuration.

8. A refrigerator cabinet for dual temperature refrigerators as claimed in claim 1 wherein said cabinet includes a divider panel dividing said cabinet into a fresh food and a freezer compartment, the lateral edges of said divider panel fitted within recesses formed in at least the interior faces of said left and right side walls of said cabinet.

9. A refrigerator cabinet as claimed in claim 1 wherein said floor is separate from said base plinth, said floor means comprises a bottom partition spanning between three or more sides of said folded plastic member, within the included space there between, said partition alone or in combination with said base plinth enclosing the bottom end of said refrigeration space.

10. A refrigerator cabinet as claimed in claim 9 wherein said base plinth includes on the top face thereof, along at least two sides thereof at or adjacent the periphery thereof, a recessed channel, the bottom edge of said folded plastic wall member fitted into said base plinth channel, said channel retaining the bottom edge of said wall member in said folded configuration.

11. A refrigerator cabinet as claimed in claim 9 wherein said bottom partition is substantially independent of said base plinth, and is fitted within a complementary recess or channel formed in the inwardly facing left and right side walls of said folded wall member, said partition having the rearward edge thereof substantially higher than the forward edge thereof.

12. A refrigerator cabinet as claimed in claim 9 wherein said partition includes a substantially horizontal rearward portion, a substantially horizontal forward portion, and a transition therebetween, said left and right wall members having a channel therein accommodating the left and right edges of said partition, said channel formed to correspond to the profile of said partition.

13. A refrigerator cabinet as claimed in claim 9 wherein the interior face of the bottom edge of said back wall includes a channel therein accommodating the rearward edge of said bottom partition.

14. A refrigerator cabinet as claimed in claim 1 wherein the floor means is integrated with the base plinth, said base plinth includes a raised floor member, spanning between three or more sides of said folded plastic member and enclosing the bottom end of said refrigeration space, there being a space below said floor member and between downwardly extended fridge supporting members of said base plinth, said space adapted to receive mechanical and/or electrical components of said refrigerator.

15. A refrigerator cabinet as claimed in claim 14 wherein said downwardly extended fridge supporting members include means to connect to the bottom edge of at least the left and right sides of said cabinet.

16. A refrigerator cabinet as claimed in claim 14 wherein said downwardly extended fridge supporting members each include a lateral extension having an upwardly facing channel formed there along into which the bottom edge of a respective left or right side wall of said cabinet is fitted.

17. A refrigerator cabinet as claimed in claim 14 wherein said base plinth includes a removable tray adapted to carry said refrigerator mechanical components, said tray supported by said downward extensions, under said floor member.

18. A refrigerator cabinet as claimed in claim 14 wherein at least the upper face of said floor member includes a back plateau, a front plateau and a transition here between, and the inside surfaces of said left and right side cabinet walls include rebates at the bottom edges there of which accommodate the lateral extremes of said floor member.

19. A refrigerator cabinet as claimed in claim 1 wherein a tray adapted to carry refrigerator mechanical components is formed integrally with said base plinth, below said floor means.

20. A refrigerator including a refrigerator cabinet as claimed in claim 1, a door mounted on said refrigeration cabinet to enclose the front side of said refrigeration space and thereby fully enclose said refrigeration space, and a refrigeration system to refrigerate said refrigeration space, at least a part of said refrigeration system being mounted on said base plinth.

21. A method of forming a refrigerator cabinet comprising the steps of:
  (a) thermoforming a twin walled insulated plastic member divided, by a plurality of elongate seams at which said twin walls contact, into three or more wall sections disposed sequentially in a side by side relation,
  (b) folding said plastic wall member along each said seam to form three or more sides of a cabinet connected at said elongate seams, said sides defining a refrigeration space therebetween, and
  (c) fitting a top end cap to said cabinet to retain said wall member in said folded configuration and enclose the top end of said refrigeration space, and
  (d) fitting a base plinth to the bottom edge of said wall member to retain the bottom edge of said wall member in said folded configuration.

22. A method of forming a refrigerator cabinet as claimed in claim 21 including, prior to step (b), the steps of:
  (i) while said plastic member is still retained in its thermoforming mould, introducing a foaming material into the cavity of each said wall section, said forming material to expand as a foam and fill said cavities and to solidify therein, and
  (ii) subsequently removing said plastic member from its thermoforming mould.

23. A method of forming a refrigerator cabinet as claimed in claim 21 including, prior to folding said plastic wall member, removing an inner side mold half, and with said wall member still supported on the outer half of said thermoforming mold, heating said wall member in the region of said seams to substantially soften the material at said seams before folding.

24. A method of forming a refrigerator cabinet as claimed in claim 23 including, after removing said inner side mould half and before said folding, they step of laying a wiring harness and or refrigerator mechanical components in channels formed on the inner face of said wall member.

25. A method of forming a refrigerator cabinet as claimed in claim 21 wherein said wall member includes recessed channels in at least the left and right side forming portions thereof close to the bottom edge thereof and said method includes, when folding said plastic wall member to form said cabinet, retaining a bottom partition in position such that the left and right side edges of said bottom partition are retained in said recesses of said wall member side forming portions upon fielding.

26. A method of forming a refrigerator cabinet as claimed in claim 21 including slidably fitting a dividing partition into channels formed in said left and right side wall forming portions of said wall member at a position intermediate of said top end cap and said bottom forming a partition to form a fridge/freezer divider panel.

27. A cabinet including:
  a twin walled plastic member divided, by a plurality of elongate seams at which said twin walls contact, into three or more wall sections disposed sequentially in a side by side relation, said member folded at said seams such that said sequence of wall sections form three or more sides of a cabinet connected at said elongate seams, and
  a top and a bottom end cap, having generally an interior and an exterior face and having on the inner face along at least two sides thereof at or adjacent the periphery thereof a recessed channel, the top and bottom edge respectively of said folded plastic wall member fitted into said channel or channels, said channel or channels retaining said wall member in said folded configuration.

28. A cabinet as claimed in claim 27 wherein one or more of said folded seams do not coincide with the corner between sides of said cabinet that correspond to said wall sections joined by the respective said folded seam.

29. A cabinet as claimed in claim 27 wherein said twin walled plastic member has essentially an inner facing sheet and an outer facing sheet, and said member is formed adjacent at least one said seam such that said inner facing sheet contacts itself, said contact being between portions thereof on opposite sides of said seam and spaced from said seam, said contacting portions being fused to one another.

30. A cabinet for an appliance including a wall member formed by twin sheet thermoforming, said wall member incorporating a plurality of panels, said panels connected to one another by one or more joined edges where said twin sheets contact to form a seam, and in said appliance said wall member being in a folded condition along one or more of said seams such that said plurality of panels form a plurality of walls of said appliance, being, as a group, differently configured to when said wall member was initially thermoformed, wherein one or more of said folded seams do not coincide with the corner between walls of said appliance that correspond to the panels joined by the respective folded seam.

31. A cabinet as claimed in claim 30 wherein said respective folded seam is between an edge of one panel which forms an edge of the surface at least contributing to one said wall of said corner of said one panel, and the edge of another panel which forms an edge of a surface at an angle to the surface of said other panel at least contributing to the other wall of said corner, said wall member folded at said seam, through said angle, such that said surface at an angle of said other panel contributes to said one said wall of said corner, and separates said folded seam from said corner.

32. A cabinet as claimed in claim 30 wherein each said respective folded seam is between an edge of one panel and an edge of another panel, and with said wall member in an unfolded condition said one panel includes an exterior wall surface adjacent said seam, and said other panel includes a first exterior wall surface and a second exterior wall surface, said first exterior wall surface being adjacent said seam and at an angle to said exterior wall surface of said one panel, and said wall member is in said folded condition with said exterior wall surface of said one panel and said exterior wall surface of said other panel contributing to one wall of said cabinet, and said first exterior wall surface of said other panel separating said folded seam from said corner.

33. A cabinet for an appliance including a wall member formed by twin sheet thermoforming, said wall member incorporating a plurality of panels, said panels connected to one another by one or more joined edges where said twin sheets contact to form a seam, and in said appliance said wall member being in a folded condition along one or more of said seams such that said plurality of panels form a plurality of walls of said appliance, being, as a group, differently configured to when said wall member was initially thermoformed, at at least one said seam said twin walled plastic member having essentially an inner facing sheet and an outer facing sheet, and said member is formed adjacent at said seam such that in said folded condition said inner facing sheet contacts itself, said contact being between portions thereof on opposite sides of said seam and spaced from said seam, said contacting portions being fused to one another.

34. A cabinet as claimed in claim 33 wherein said contact between said portions of said inner sheet occurs along a line substantially coextensive with and parallel to said seam.

35. A wall member formed by twin sheet thermoforming including one or more seams where said twin sheets contact, said wall member adapted to be folded at one or more of said seams to form a plurality of walls, characterised in that at least one said seam is intended to be folded through a set angle, and that at least one said sheet of said twin sheets includes at least a first and a second surface and, at or substantially at said seam, an included corner between said first and second surfaces thereof, the angle of said corner being the complement of said set angle, such that if said seam is folded through said set angle; the gradient of said surfaces will be substantially continuous across said seam.

36. A wall member as claimed in claim 35 wherein said sheet having said first and second surfaces includes a third surface, and said second surface meets said third surface at a projecting corner substantially parallel to said seam but spaced therefrom, said corner including said set angle such that said third surface is substantially co-planar with said first surface.

37. A wall member as claimed in claim 36 including a pair of said seams, parallel and spaced apart, dividing said wall member into three side-by-side panels, one sheet of said wall member having said first, second and third surfaces, and fourth and fifth surfaces, with each of said first, third and fifth surfaces constituting a substantially planar major surface associated with a respective panel, said first, third and fifth surfaces being substantially parallel, with said pair of seams being at opposed edges of said first surface and said second surface extending from the seamward edge of said third surface to the respective seam edge of said first surface and said fourth surface extending from the seamward edge of said fifth surface to the respective seam edge of said first surface, and second and fourth surfaces being approximately 90 degrees to said first, third and fifth surfaces, such that if said seams are folded through 90 degrees, said second and fourth surfaces will align with said first surface and said third and fifth surfaces will extend perpendicularly from the edges of said second and fourth surfaces with the folded seams udisposed entirely on a face formed by said first, second and fourth surfaces.

* * * * *

UNITED STATES PATENT AND TRADEMARK OFFICE
CERTIFICATE OF CORRECTION

PATENT NO.    : 6,460,955 B1
DATED         : October 8, 2002
INVENTOR(S)   : Stewart Vaughan and Daniel Witten-Hannah It is certified that error appears in the above-identified patent and that said Letters Patent is hereby corrected as shown below:

Column 6,
Line 45, "pat" should be -- part --

Column 11,
Line 46, "here" should be -- there --

Column 12,
Line 13, "forming" should be -- foaming --
Line 39, "fielding" should be -- folding --

Signed and Sealed this

Eleventh Day of March, 2003

JAMES E. ROGAN
*Director of the United States Patent and Trademark Office*